United States Patent
Lin et al.

(10) Patent No.: US 9,661,460 B2
(45) Date of Patent: May 23, 2017

(54) METHOD AND APPARATUS FOR PROVIDING USER PLANE OR CONTROL PLANE POSITION SERVICES

(71) Applicant: QUALCOMM Incorporated, San Diego, CA (US)

(72) Inventors: Ie-Hong Lin, Cupertino, CA (US); Kirk Allan Burroughs, Alamo, CA (US); Deepika Srinivasan, San Jose, CA (US); Srigouri Kamarsu, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/929,110

(22) Filed: Oct. 30, 2015

(65) Prior Publication Data

US 2016/0057570 A1  Feb. 25, 2016

Related U.S. Application Data

(62) Division of application No. 13/793,801, filed on Mar. 11, 2013, now Pat. No. 9,204,256.

(51) Int. Cl.
*H04W 4/02* (2009.01)
*H04W 64/00* (2009.01)
(Continued)

(52) U.S. Cl.
CPC ............... *H04W 4/02* (2013.01); *G01S 5/00* (2013.01); *H04W 4/025* (2013.01); *H04W 4/22* (2013.01);
(Continued)

(58) Field of Classification Search
CPC ...... H04W 4/025; H04W 64/00; H04W 88/02
(Continued)

(56) References Cited

U.S. PATENT DOCUMENTS

| 8,472,917 B1* | 6/2013 | Rahman | H04M 11/04 455/404.1 |
| 2004/0137873 A1* | 7/2004 | Kauppinen | H04M 7/006 455/404.1 |

(Continued)

FOREIGN PATENT DOCUMENTS

| CN | 101217746 A | 7/2008 |
| EP | 2099242 A2 | 9/2009 |

(Continued)

OTHER PUBLICATIONS

International Search Report and Written Opinion—PCT/US2014/016324—ISA/EPO—Aug. 5, 2014.

*Primary Examiner* — Qun Shen
(74) *Attorney, Agent, or Firm* — Thien Nguyen (57) ABSTRACT

A dual SIM mobile terminal, such as a Dual SIM Dual Active (DSDA) mobile terminal, connects to a network and performs a user plane or control plane positioning session through the network. When the positioning session is originated by the mobile terminal, either SIM card may be used to connect to its associated network. When the positioning session is originated by another entity in the network, either SIM card may be used for the positioning session. When the mobile terminal connects to a network for an emergency call using either SIM card and an emergency positioning session is performed through the network, the emergency positioning session is permitted only during the emergency call and an emergency callback period and permitted only on a subscription on which the emergency call originated, and no non-emergency positioning sessions with either SIM card is permitted during the emergency positioning session or emergency call.

4 Claims, 5 Drawing Sheets

(51) Int. Cl.
    *H04W 8/18*     (2009.01)
    *G01S 5/00*     (2006.01)
    *H04W 4/22*     (2009.01)
    *H04W 88/06*     (2009.01)
    *H04W 76/00*     (2009.01)

(52) U.S. Cl.
    CPC .......... *H04W 8/183* (2013.01); *H04W 64/00* (2013.01); *H04W 76/007* (2013.01); *H04W 88/06* (2013.01)

(58) Field of Classification Search
    USPC ............................................ 455/404.1, 404.2
    See application file for complete search history.

(56) References Cited

U.S. PATENT DOCUMENTS

| | | | |
|---|---|---|---|
| 2006/0274696 A1* | 12/2006 | Krishnamurthi | H04W 64/00 370/331 |
| 2007/0121560 A1* | 5/2007 | Edge | H04W 64/00 370/338 |
| 2008/0014990 A1 | 1/2008 | Jain et al. | |
| 2009/0036142 A1* | 2/2009 | Yan | H04W 60/00 455/456.1 |
| 2009/0280770 A1* | 11/2009 | Mahendran | H04L 29/12594 455/404.1 |
| 2010/0061308 A1* | 3/2010 | Becker | H04W 60/04 370/328 |
| 2010/0208649 A1 | 8/2010 | Chang et al. | |
| 2010/0289640 A1 | 11/2010 | Annamalai | |
| 2010/0291947 A1* | 11/2010 | Annamalai | G01S 5/0263 455/456.1 |
| 2011/0076982 A1* | 3/2011 | Li | H04W 48/18 455/404.1 |
| 2011/0081951 A1 | 4/2011 | Hwang | |
| 2011/0086609 A1* | 4/2011 | Buehler | G08B 25/005 455/404.2 |
| 2011/0090872 A1 | 4/2011 | Dahlen et al. | |
| 2012/0077494 A1 | 3/2012 | Kim et al. | |
| 2012/0149372 A1* | 6/2012 | Lee | G01S 5/02 455/435.1 |
| 2012/0252492 A1 | 10/2012 | Chien | |
| 2012/0264425 A1 | 10/2012 | Krishnamoorthy et al. | |
| 2013/0109344 A1* | 5/2013 | Ung | H04W 4/14 455/404.2 |
| 2013/0237251 A1 | 9/2013 | Suzuki et al. | |
| 2014/0256283 A1 | 9/2014 | Lin et al. | |

FOREIGN PATENT DOCUMENTS

| | | |
|---|---|---|
| EP | 2466974 A1 | 6/2012 |
| JP | 2011015406 A | 1/2011 |
| JP | 2011019227 A | 1/2011 |
| JP | 2012231423 A | 11/2012 |
| WO | WO-2011055797 A1 | 5/2011 |
| WO | 2011158063 A1 | 12/2011 |
| WO | WO-2011150259 A1 | 12/2011 |
| WO | 2012051445 A1 | 4/2012 |
| WO | WO-2013007869 A1 | 1/2013 |
| WO | WO-2013012742 A2 | 1/2013 |

* cited by examiner

METHOD AND APPARATUS FOR PROVIDING USER PLANE OR CONTROL PLANE POSITION SERVICES

CROSS-REFERENCE TO RELATED APPLICATION(S)

This application is a divisional of and claims priority to U.S. application Ser. No. 13/793,801, filed Mar. 11, 2013, which is assigned to the assignee hereof and which is incorporated herein by reference.

BACKGROUND

Background Field

Embodiments of the subject matter described herein are related generally to a mobile terminal that uses dual Subscriber Identity Module (SIM) cards, and more particularly to originating or receiving a positioning session on either SIM card with the dual SIM mobile terminal as well as performing emergency positioning sessions.

Relevant Background

A dual SIM mobile terminal is capable of holding multiple, e.g., two or more, Subscriber Identity Module (SIM) cards. In some dual SIM mobile terminals, both SIM cards may be active simultaneously allowing the user to access two different subscriptions for different networks. By way of example, a Dual SIM Dual Active (DSDA) mobile terminal includes two SIM cards and is capable of being connected to two different networks at the same time.

It is often desirable, and sometimes necessary, to know the location of a mobile terminal. The terms "location" and "position" are synonymous and are used interchangeably herein. For example, an application on the mobile terminal may desire to know its location and may accordingly the mobile terminal initiate a user plane or control plane positioning session, which is sometimes referred to as a mobile originated positioning session. Additionally, a different entity, e.g., a location services (LCS) client, on the network side may desire to know the location of the mobile terminal, and accordingly, the user plane or control plane positioning session may be initiated by a network connected to the mobile terminal, which is sometimes referred to as a mobile terminated positioning session.

SUMMARY

A dual SIM mobile terminal, such as a Dual SIM Dual Active (DSDA) mobile terminal, connects to a network and performs a user plane or control plane positioning session through the network. When the positioning session is originated by the mobile terminal, either SIM card may be used to connect to its associated network. For example, the initial SIM card used to attempt to initiate the positioning session may be a default SIM card or may be selected, e.g., by a user or application. The mobile terminal may switch to the other SIM card for the positioning session, e.g., if the network associated with the initial SIM card is unavailable, weak, busy, or unresponsive, or if a data transfer limit or a limit on a total number of simultaneous data sessions has been reached. When the positioning session is originated by another entity in the network, either SIM card may be used for the positioning session. As the subscriptions associated with the SIM cards may have different rules of service interactions, the mobile terminal follows the rules of service interactions of the subscription associated with the SIM card used for the positioning session. When the mobile terminal connects to a network for an emergency call using either SIM card and an emergency positioning session is performed through the network, the emergency positioning session is permitted only during the emergency call and an emergency callback period after the emergency call and permitted only on a subscription on which the emergency call is originated, and no non-emergency positioning sessions with either SIM card is permitted during the emergency positioning session or during an emergency call and the emergency callback period after an emergency call.

In one implementation, a method of providing user plane or control plane positioning services in a dual Subscriber Identity Module (SIM) mobile terminal, includes connecting the dual SIM mobile terminal to a network, wherein the network is one of a first network associated with a first subscription accessed with a first SIM card in the dual SIM mobile terminal and a second network associated with a second subscription accessed with a second SIM card in the dual SIM mobile terminal; and performing a user plane or control plane positioning session through the network; wherein when the user plane or control plane positioning session is initiated by the dual SIM mobile terminal, either the first subscription associated with the first SIM card or the second subscription associated with the second SIM card is used for the user plane or control plane positioning session; wherein when the user plane or control plane positioning session is initiated by the network, either the first subscription associated with the first SIM card or the second subscription associated with the second SIM card is used for the user plane or control plane positioning session.

In one implementation, a mobile terminal includes a first Subscriber Identity Module (SIM) card that accesses a first subscription associated with a first network; a second SIM card that accesses a second subscription associated with a second network; a transceiver that communicates with the first network and the second network; a processor connected to the transceiver, the processor configured to use the transceiver to connect to a network, and perform a user plane or control plane positioning session through the network, wherein when the user plane or control plane positioning session is initiated by the mobile terminal, either the first subscription associated with the first SIM card or the second subscription associated with the second SIM card is used for the user plane or control plane positioning session; wherein when the user plane or control plane positioning session is initiated by the network, either the first subscription associated with the first SIM card or the second subscription associated with the second SIM card is used for the user plane or control plane positioning session.

In one implementation, a dual Subscriber Identity Module (SIM) mobile terminal includes means for connecting to a network, wherein the network is one of a first network associated with a first subscription accessed with a first SIM card and a second network associated with a second subscription accessed with a second SIM card; and means for performing a user plane or control plane positioning session through the network; wherein when the user plane or control plane positioning session is initiated by the dual SIM mobile terminal, either the first subscription associated with the first SIM card or the second subscription associated with the second SIM card is used for the user plane or control plane positioning session; wherein when the user plane or control plane positioning session is initiated by the network, either the first subscription associated with the first SIM card or the second subscription associated with the second SIM card is used for the user plane or control plane positioning session.

In one implementation, a non-transitory computer-readable medium including program code stored thereon, includes program code to connect a dual SIM mobile terminal to a network, wherein the network is one of a first network associated with a first subscription accessed with a first SIM card in the dual SIM mobile terminal and a second network associated with a second subscription accessed with a second SIM card in the dual SIM mobile terminal; and program code to perform a user plane or control plane positioning session through the network; wherein when the user plane or control plane positioning session is initiated by the dual SIM mobile terminal, either the first subscription associated with the first SIM card or the second subscription associated with the second SIM card is used for the user plane or control plane positioning session; wherein when the user plane or control plane positioning session is initiated by the network, either the first subscription associated with the first SIM card or the second subscription associated with the second SIM card is used for the user plane or control plane positioning session.

In one implementation, a method of supporting an emergency positioning session in a dual Subscriber Identity Module (SIM) mobile terminal, includes connecting the dual SIM mobile terminal to a network for an emergency call, wherein the network is one of a first network associated with a first subscription accessed with a first SIM card in the dual SIM mobile terminal and a second network associated with a second subscription accessed with a second SIM card in the dual SIM mobile terminal; and performing an emergency positioning session through the network; wherein the emergency positioning session is permitted only during the emergency call and an emergency callback period after the emergency call; wherein the emergency positioning session is permitted only on a subscription on which the emergency call is originated; wherein no non-emergency positioning sessions on either the first subscription or the second subscription are permitted during the emergency positioning session or during the emergency call.

In one implementation, a mobile terminal includes a first Subscriber Identity Module (SIM) card that accesses a first subscription associated with a first network; a second SIM card that accesses a second subscription associated with a second network; a transceiver that communicates with the first network and the second network; a processor connected to the transceiver, the processor configured to use the transceiver to connect to a network for an emergency call, wherein the network is one of the first network associated with the first subscription accessed with the first SIM card and the second network associated with the second subscription accessed with the second SIM card; and perform an emergency positioning session through the network, wherein the emergency positioning session is permitted only during the emergency call and an emergency callback period after the emergency call, wherein the emergency positioning session is permitted only on a subscription on which the emergency call is originated, and wherein no non-emergency positioning sessions on either the first subscription or the second subscription are permitted during the emergency positioning session or during the emergency call.

In one implementation, a dual Subscriber Identity Module (SIM) mobile terminal includes means for connecting the dual SIM mobile terminal to a network for an emergency call, wherein the network is one of a first network associated with a first subscription accessed with a first SIM card in the dual SIM mobile terminal and a second network associated with a second subscription accessed with a second SIM card in the dual SIM mobile terminal; and means for performing an emergency positioning session through the network; wherein the emergency positioning session is permitted only during the emergency call and an emergency callback period after the emergency call; wherein the emergency positioning session is permitted only on a subscription on which the emergency call is originated; wherein no non-emergency positioning sessions on either the first subscription or the second subscription are permitted during the emergency positioning session or during the emergency call.

In one implementation, a non-transitory computer-readable medium including program code stored thereon, includes program code to connect a dual SIM mobile terminal to a network for an emergency call, wherein the network is one of a first network associated with a first subscription accessed with a first SIM card in the dual SIM mobile terminal and a second network associated with a second subscription accessed with a second SIM card in the dual SIM mobile terminal; and program code to perform an emergency positioning session through the network; wherein the emergency positioning session is permitted only during the emergency call and an emergency callback period after the emergency call; wherein the emergency positioning session is permitted only on a subscription on which the emergency call is originated; wherein no non-emergency positioning sessions on either the first subscription or the second subscription are permitted during the emergency positioning session or during the emergency call.

DETAILED DESCRIPTION

Figure 1:
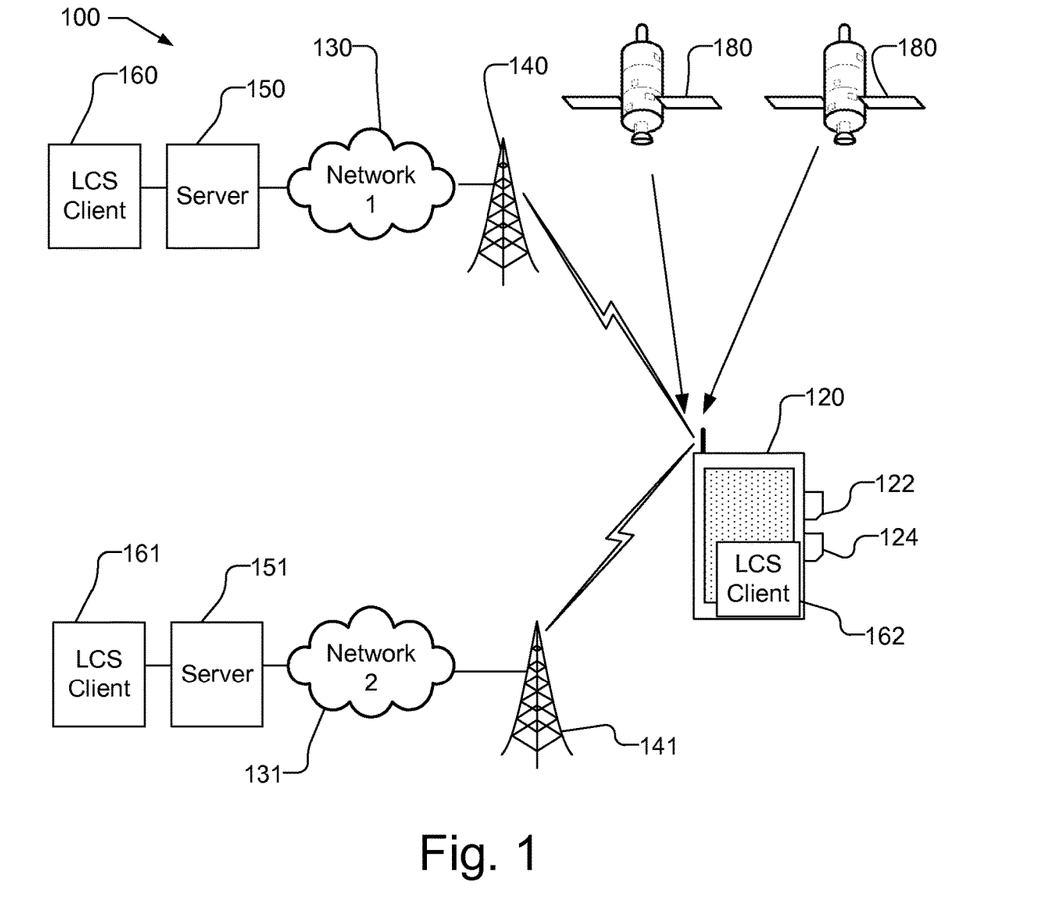
FIG. 1 shows a network architecture that may be used with a dual SIM mobile terminal configured for originating or receiving a positioning session on either SIM card.

FIG. 1 shows a network architecture 100 that may be used with a dual SIM mobile terminal 120, with a first SIM card 122 and a second SIM card 124 illustrated, and that is configured for originating or receiving a positioning session on either SIM card. A dual SIM mobile terminal as used herein is a device having at least two SIM cards and being capable of wirelessly communicating with a server through two or more networks associated with subscriptions respectively accessed by the SIM cards. The mobile terminal 120 supports positioning and location services, which may include, but is not limited to, the Secure User Plane Location (SUPL) location solution defined by OMA and the Control Plane location solution defined by 3GPP and 3GPP2. The SUPL location solution is defined in documents OMA-TS-ULP from OMA which are publicly available. The control plane location solution are defined in 3GPP2 C.S0022, 3GPP TS 23.271, 3GPP TS 25.305, 3GPP TS 36.305, 3GPP TS 44.031, 3GPP TS 25.331 and 3GPP TS 36.355 which are publicly available.

The mobile terminal 120 may be a device such as a cellular or other wireless communication device, personal communication system (PCS) device, personal navigation device (PND), Personal Information Manager (PIM), Personal Digital Assistant (PDA), laptop or other suitable mobile terminal which is capable of receiving wireless communication and/or navigation signals. Additionally, the mobile terminal 120 may include devices which communicate with a personal navigation device (PND), such as by short-range wireless, infrared, wireline connection, or other connection—regardless of whether satellite signal reception, assistance data reception, and/or position-related processing occurs at the device or at the PND. Server 150 and server 151 as used herein may be a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

Location services (LCS) may be performed on behalf of an LCS Client 160 that accesses location server 150, both of which are associated with network 130, or on behalf of an LCS Client 161 that accesses location server 151, both of which are associated with network 131. A request for the location of mobile terminal 120 is issued through the associated network 130 or 131 and the requested LCS Client 160 or 161 receives back from its respective location server 150 or 151 a location estimate for mobile terminal 120. LCS Client 160 and LCS Client 161 may also be known as a SUPL Agent—e.g. when the location protocol used by respective location server 150 and location server 151 and mobile terminal 120 is SUPL. Mobile terminal 120 may also include an LCS Client 162 (or SUPL agent in case that SUPL is used) that may issue a location request to some positioning capable function within mobile terminal 120 and later receive back a location estimate for mobile terminal 120. The LCS Client 162 (or SUPL Agent) within mobile terminal 120 may perform location services for the user of mobile terminal 120—e.g. provide navigation directions or identify points of interest within the vicinity of mobile terminal 120.

As illustrated in FIG. 1, the mobile terminal 120 may communicate with a server 150 through a first network 130 or with server 151 through a second network 131. Mobile terminal 120 may communicate through the first network 130 using a first Radio Access Network (RAN) 140 that is associated with the first network 130 and that is associated with the subscription accessed by the first SIM card 122. Mobile terminal 120 may communicate through the second network 131 using a second Radio Access Network (RAN) 141, which is associated with the second network 131, and which is associated with the subscription accessed by the second SIM card 124.

Mobile terminal 120 may receive and measure signals from the RANs 140 and 141, which may be used for position determination. Wireless communication networks RANs 140 and 141 may be wireless wide area networks (WWAN), wireless local area networks (WLAN), a wireless personal area networks (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For example, RAN1 140 may be, e.g., an evolved UMTS Terrestrial Radio Access Network (E-UTRAN) (LTE) network, a W-CDMA UTRAN network, a GSM/EDGE Radio Access Network (GERAN), a 1×RTT network, an Evolution-Data Optimized (EvDO) network, a WiMax network or a WLAN, while RAN2 141 may be one of the above networks that is different than RAN1 140.

As illustrated in FIG. 1, mobile terminal 120 may also receive signals from one or more Earth orbiting satellite vehicles (SVs) 180, which are part of satellite positioning system (SPS). The SVs, for example, may be in a constellation of Global Navigation Satellite System (GNSS) such as Global Positioning System (GPS), Galileo, GLONASS or Compass. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou or Compass over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Mobile terminal 120 may measure signals from SVs 180 and/or RANs 140, 141 associated with the first and second networks 130 and 131 and may obtain pseudo-range measurements for the satellites and network measurements from RANs 140, 141. The pseudo-range measurements and/or network measurements may be used to derive a position estimate for mobile terminal 120. The server 150 or server 151 may be used to provide location related information, such as assistance data, to the mobile terminal 120, which may be used to assist in acquiring and measuring signals from SVs 180 (e.g., in an assisted satellite positioning session) and RANs 140, 141 and/or in deriving a position estimate from these measurements. Additionally, mobile terminal 120 may provide location related information, such as an estimated position or location measurements (e.g., satellite measurements from one or more GNSSs, or network measurements from one or more networks, etc.), to the server 150 or server 151.

In operation, the mobile terminal 120 may permit mobile originated (MO) positioning sessions using either the first network 130 or the second network 131, i.e., either subscription accessed with either SIM cards 122 or 124 may be used. The mobile terminal may attempt to initiate the MO positioning session using an initial SIM card, e.g., a default or a selected SIM card, and may switch to a secondary SIM card under specific predetermined conditions, e.g., the network associated with the initial SIM card is not available, has a weak signal, is busy, or the mobile terminal has reached a data limit or a limit on simultaneous data sessions on the initial SIM card. By way of example, the first subscription accessed by the first SIM card 122 may be a default subscription for the mobile terminal 120, and MO positioning sessions are initiated using the default subscription, i.e., the subscription associated with the first SIM card 122. If desired, the default subscription may be default for both data and voice or default for only data. Alternatively, if a default subscription is not used, or has not been assigned, the mobile terminal 120 may query the user with which SIM card 122 or 124 (i.e., which subscription) the user would like to originate the MO session. Additionally, the mobile terminal application that is requesting the positioning session may be associated with a specific SIM card, and thus, the mobile terminal application may select a SIM card to originate the MO positioning session, where the selected SIM card may be a non-default SIM card. If the network associated with the initial subscription is, e.g., unavailable, weak, busy, or unresponsive, or the mobile terminal 120 has reached a limit on the initial subscription (e.g., a data transfer limit or a limit on total number of simultaneous data sessions), etc., the mobile terminal 120 may switch to the second SIM card 124 and initiate the MO positioning session with the second subscription, i.e., the subscription associated with the non-default or unselected SIM card 124.

Additionally, the mobile terminal 120 may permit mobile terminated (MT) positioning sessions, e.g., positioning sessions that are initiated through the network 130 by LCS Client 160 or through the network 131 by LCS Client 161. Thus, either the subscription accessed with SIM card 122 or the subscription accessed with SIM card 124 may be used for the positioning session. For example, the SIM card associated with the network through which the request for a positioning session was received may be used for the positioning session.

The first subscription and the second subscription may have different rules of service interactions for positioning sessions. For example, the subscription accessed by the first SIM card 122 may grant the new mobile originated or mobile terminated positioning request and terminate an ongoing positioning session to make resources available for the new request; whereas the subscription accessed by the second SIM card 124 may maintain the ongoing positioning session and reject the new positioning request. Accordingly, the mobile terminal 120 may follow the rules of service interactions of the subscription hosting the existing active positioning session, for both MO and MT positioning sessions. Following the rule of service interactions of the subscription that is hosting an existing positioning session offers the advantage that fair treatment is given to both subscriptions.

Figure 2:
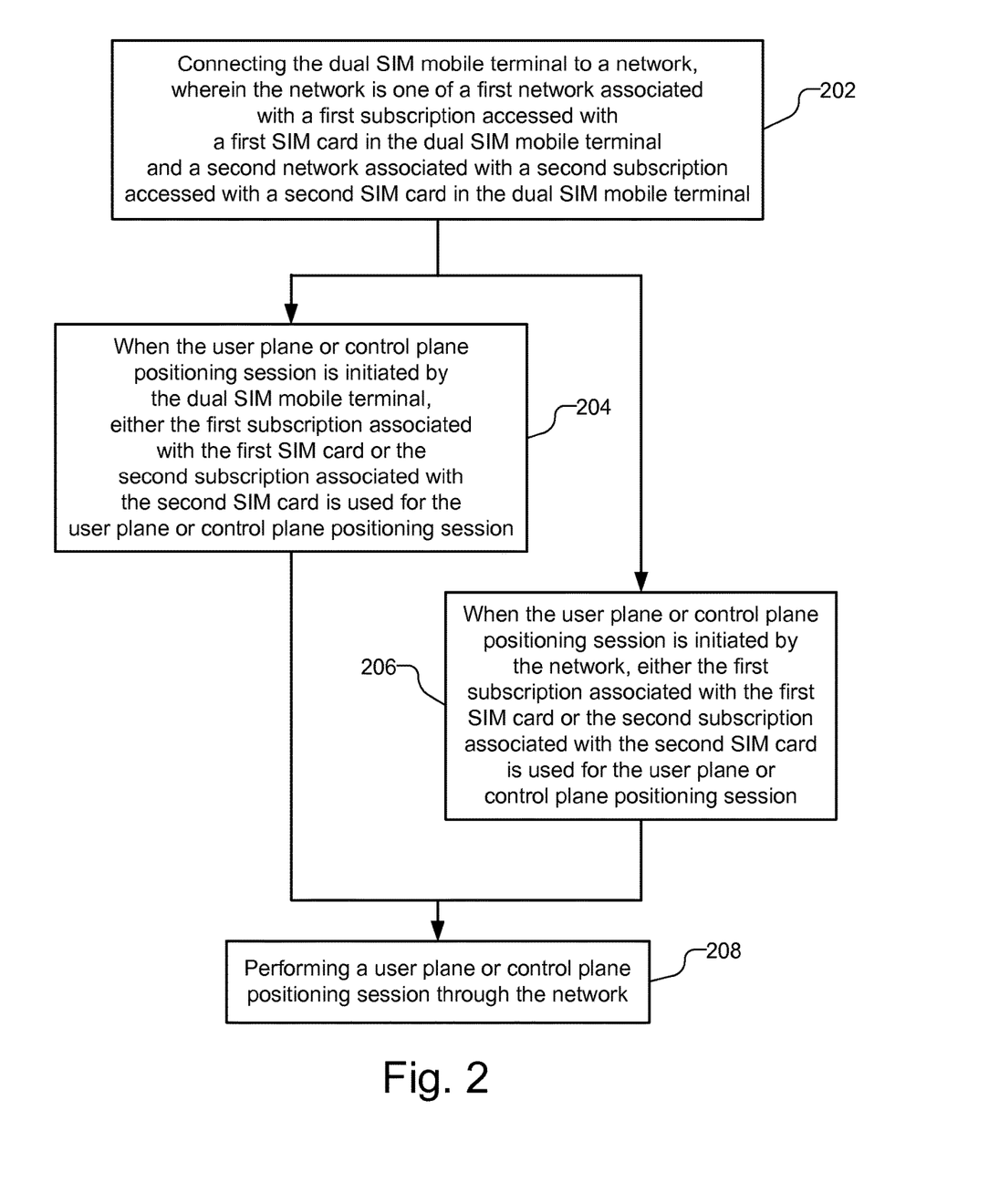
FIG. 2 is a flow chart of a method of providing user plane or control plane positioning sessions with a dual SIM mobile terminal.

FIG. 2 is a flow chart of a method of providing user plane or control plane positioning services in a dual SIM mobile terminal, such as mobile terminal 120, which may be, e.g., a Dual SIM Dual Active (DSDA) mobile terminal. As illustrated, the method includes connecting the dual SIM mobile terminal to a network, wherein the network is one of a first network associated with a first subscription accessed with a first SIM card in the dual SIM mobile terminal and a second network associated with a second subscription accessed with a second SIM card in the dual SIM mobile terminal (202). When a user plane or control plane positioning session is initiated by the dual SIM mobile terminal, either the first subscription associated with the first SIM card or the second subscription associated with the second SIM card is used for the user plane or control plane positioning session (204). For example, performing the user plane or control plane positioning session through the network may comprise attempting to initiate the user plane or control plane positioning session with the dual SIM mobile terminal using the first subscription and switching to use the second subscription to initiate the user plane or control plane positioning session with the dual SIM mobile terminal. The first subscription may be, e.g., a default subscription or a selected subscription for the user plane or control plane positioning session. By way of example, the subscription may be selected by the user or by the mobile terminal application that requests the positioning session. The second subscription may be used to initiate the user plane or control plane positioning session when the first network associated with the first subscription is one of unavailable, weak, busy, or unresponsive. Additionally, the second subscription may be used to initiate the user plane or control plane positioning session when the first subscription has reached a data transfer limit or a limit on a total number of simultaneous data sessions. Moreover, when a user plane or control plane positioning session is initiated by the network, either the first subscription associated with the first SIM card or the second subscription associated with the second SIM card is used for the user plane or control plane positioning session (206). A positioning session, which is a user plane or control plane positioning session, is performed through the network (208). For example, the user plane or control plane positioning session performed through the network may be, e.g., an assisted satellite positioning session that uses the network.

If the first subscription and the second subscription have different rules of service interactions, the performing the user plane or control plane positioning session through the network (208) includes following the rules of service interactions of the first subscription when the user plane or control plane positioning session is through the first subscription and following the rules of service interactions of the second subscription when the user plane or control plane positioning session is through the second subscription.

Figure 3:
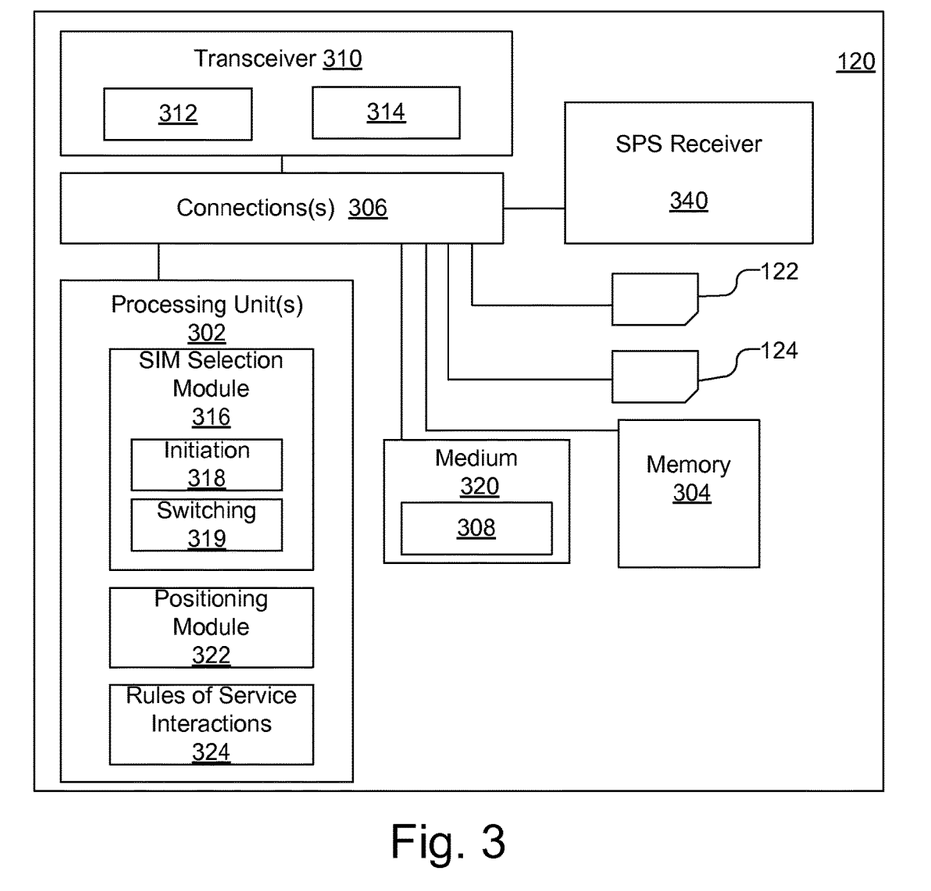
FIG. 3 illustrates a schematic block diagram illustrating certain example features of a dual SIM mobile terminal configured for originating or receiving a positioning session on either SIM card.

FIG. 3 illustrates a schematic block diagram illustrating certain example features of a dual SIM mobile terminal, such as mobile terminal 120, which may be, e.g., a Dual SIM Dual Active (DSDA) mobile terminal configured for originating or receiving a positioning session on either SIM card as discussed above. Mobile terminal 120 may, for example, include a first SIM card 122 that accesses a first subscription associated with a first network and a second SIM card 124 that accesses a second subscription associated with a second network. The mobile terminal 120 may further include one or more processing units 302, memory 304, a transceiver 310 (e.g., wireless network interface), and (as applicable) an SPS receiver 340, all of which may be operatively coupled with one or more connections 306 (e.g., buses, lines, fibers, links, etc.). In certain example implementations, all or part of mobile terminal 120 may take the form of a chipset, and/or the like.

Transceiver 310 may, for example, include a transmitter 312 enabled to transmit one or more signals over one or more types of wireless communication networks and a receiver 314 to receive one or more signals transmitted over the one or more types of wireless communication networks, e.g., wireless network 130 via RAN 140 and wireless network 131 via RAN 141 in FIG. 1. If desired, transceiver 310 may include two transmitters and two receivers to transmit and receive signals to and from different networks.

The SPS receiver 340 may be enabled to receive signals associated with one or more SPS resources, e.g., satellite vehicles (SVs) 180 in FIG. 1.

Processing unit 302 may be implemented using a combination of hardware, firmware, and software. The processing unit 302 may represent one or more circuits configurable to perform at least a portion of a data signal computing procedure or process related to the operation of mobile terminal 120. The processing unit 302 may include a SIM selection module 316 to select either of the SIM cards 122 or 124 and, thus, the correspondingly associated subscriptions for a user plane or control plane positioning session initiated by the mobile terminal 120. If the user plane or control plane positioning session is initiated by the network, the SIM selection module 316 selects, e.g., the SIM card 122 or 124 that is associated with the subscription and network through which the request for a positioning session was received. The SIM selection module 316 may further include an initiation module 318 that initiates the user plane or control plane positioning session using a first subscription associated with a first SIM card, which may be a default or a user /application selected SIM (or subscription). A switching module 319 switches to a second subscription associated with the second SIM card, i.e., the non-default or non-selected SIM card, to initiate the user plane or control plane positioning session, e.g., if the first network associated with the first subscription is unavailable, weak, busy, or unresponsive or if the first subscription has reached a data transfer limit or a limit on a total number of simultaneous data sessions. The processing unit 302 may include a positioning module 322 to perform a user plane or control plane positioning session through the network, which may also use SPS signals received through the SPS receiver 340. Additionally, the processing unit 302 may include a rules of service interactions module 324 to follow the rules of service interactions of the subscription used in the user plane or control plane positioning session, e.g., wherein the first subscription and the second subscription have different rules of service interactions. The various modules 316, 318, 319, 322, and 324 may be implemented in hardware, firmware, and software or a combination thereof.

The methodologies described herein in flow charts and message flows may be implemented by various means depending upon the application. For example, these methodologies may be implemented in hardware, firmware, software, or any combination thereof. For a hardware implementation, the processing unit 302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 320 or memory 304 that is connected to and executed by processing unit 302. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions 308 or code on a non-transitory computer-readable medium, such as computer-readable medium 320 and/or memory 304. Examples include computer-readable media encoded with a data structure and computer-readable media encoded with a computer program. Non-transitory computer-readable media includes physical computer storage media. A storage medium may be any available non-transitory medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions.

Memory 304 may represent any data storage mechanism. Memory 304 may include, for example, a primary memory and/or a secondary memory. Primary memory may include, for example, a random access memory, read only memory, etc. While illustrated in this example as being separate from processing unit 302, it should be understood that all or part of a primary memory may be provided within or otherwise co-located/coupled with processing unit 302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 320. As such, in certain example implementations, the methods and/or apparatuses presented herein may take the form in whole or part of a computer-readable medium 320 that may include computer implementable instructions 308 stored thereon, which if executed by at least one processing unit 302 may be operatively enabled to perform all or portions of the example operations as described herein. Computer readable medium 320 may be a part of memory 304.

Thus, the mobile terminal 120 may include means for connecting to a network, wherein the network is one of a first network associated with a first subscription accessed with a first SIM card and a second network associated with a second subscription accessed with a second SIM card, wherein the means for connecting to a network may be, e.g., the transceiver 310 and may further include the SIM selection module 316. If the user plane or control plane positioning session is initiated by the network, the mobile terminal 120 may include means for selecting the SIM card 122 or 124 that is associated with the subscription and network through which the request for a positioning session was received, such as the SIM selection module 316. The mobile terminal 120 may further include means for attempting to initiate the user plane or control plane positioning session with the dual SIM mobile terminal using the first subscription, such as the SIM selection module 316 and the initiation module 318, and a means for switching to use the second subscription to initiate the user plane or control plane positioning session with the dual SIM mobile terminal, which may be, e.g., the SIM selection module 316 and the switching module 319. A means for performing a user plane or control plane positioning session through the network may be, e.g., the positioning module 322. The mobile terminal 120 may further include means for following the rules of service interactions of the first subscription when the user plane or control plane positioning session is through the first subscription and following the rules of service interactions of the second subscription when the user plane or control plane positioning session is through the second subscription, which may be, e.g., the rules of service interactions 324.

The dual SIM mobile terminal 120 may be used for emergency positioning sessions, e.g., a positioning session that is initiated in response to an emergency call. The mobile terminal 120 may permit the emergency positioning session only during an emergency call and the emergency callback period after an emergency call, and permit the emergency positioning session only on a subscription on which the emergency call is originated. Thus, the user position is given to the PSAP (Public Safety Answering Point) handling the call and the risk of user position given to a rogue server is reduced. Further, no non-emergency positioning sessions on either the first subscription or the second subscription may be permitted during the emergency positioning session and/or during the emergency call. Non-emergency positioning sessions may not be permitted on either the first subscription or the second subscription during the emergency callback period after an emergency call. Additionally, the mobile terminal 120 may stop an existing non-emergency positioning session when the emergency call is made. Thus, the emergency positioning session is given the highest priority and the chance of a successful emergency positioning session is improved.

Figure 4:
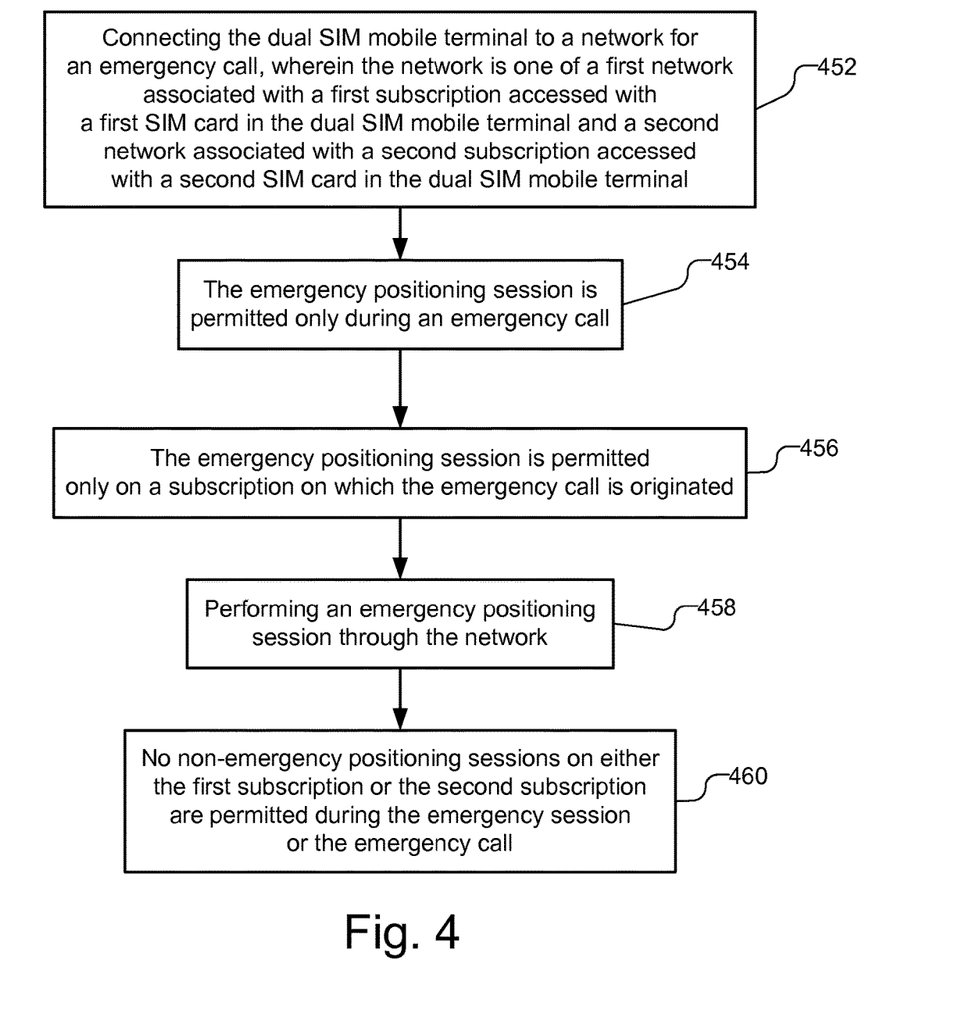
FIG. 4 illustrates a flow chart of a method of supporting an emergency positioning session in a dual SIM mobile terminal.

FIG. 4 illustrates a flow chart of a method of supporting an emergency positioning session in a dual SIM mobile terminal. The method includes connecting the dual SIM mobile terminal to a network for an emergency call, wherein the network is one of a first network associated with a first subscription accessed with a first SIM card in the dual SIM mobile terminal and a second network associated with a second subscription accessed with a second SIM card in the dual SIM mobile terminal (452). The mobile terminal may be connected to network for an emergency call, e.g., using a default or selected SIM card. As illustrated, the emergency positioning session is permitted only during an emergency call and the emergency callback period after an emergency call (454). The emergency positioning session is permitted only on a subscription on which the emergency call is originated (456). An emergency positioning session is performed through the network (458). Additionally, no non-emergency positioning sessions on either the first subscription or the second subscription are permitted during the emergency positioning session or the emergency call (460). Additionally, the method may include not permitting non-emergency positioning sessions on either the first subscription or the second subscription during the emergency callback period after an emergency call.

Figure 5:
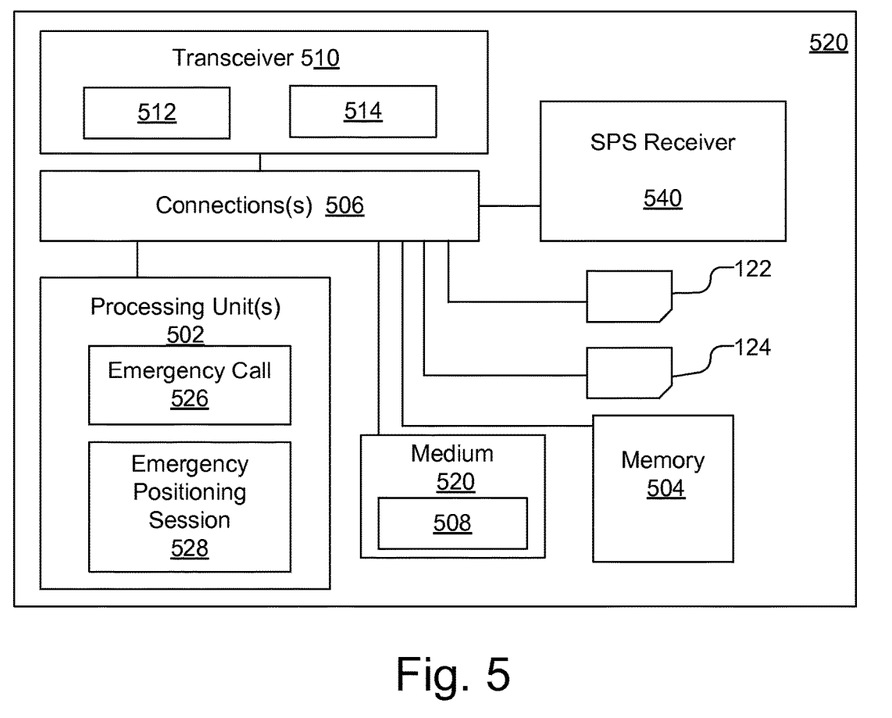
FIG. 5 illustrates a schematic block diagram illustrating certain example features of a dual SIM mobile terminal configured for an emergency positioning session.

FIG. 5 illustrates a schematic block diagram illustrating certain example features of a dual SIM mobile terminal, such as mobile terminal 520, which may be, e.g., a Dual SIM Dual Active (DSDA) mobile terminal, configured for an emergency positioning session as discussed above. The mobile terminal 520 of FIG. 5 is similar to mobile terminal 120 discussed in reference to FIG. 3, like named elements being the same. As illustrated, mobile terminal 520 may include one or more processing units 502, which may be similar to processing unit 302 discussed in reference to FIG. 3, and which may optionally include the various modules 316, 318, 319, 322, and 324 discussed above.

Processing unit 502 may be implemented using a combination of hardware, firmware, and software. The processing unit 502 may represent one or more circuits configurable to perform at least a portion of a data signal computing procedure or process related to the operation of mobile terminal 520. The processing unit 502 may include an emergency call module 526, which is used to determine when the mobile terminal 520 connects to a network for an emergency call. The processing unit 502 may further include an emergency positioning module 528 to perform an emergency positioning session through the network. As discussed above, the emergency positioning module 528 may be used to permit an emergency positioning session only during an emergency call and the emergency callback period after an emergency call, initiates the emergency positioning session using the subscription on which the emergency call is originated, and ensures that no non-emergency positioning sessions are permitted on either the first subscription or the second subscription during the emergency positioning session or during an emergency call, or during an emergency callback period after an emergency call. The emergency positioning session 528 may also be used to stop any existing non-emergency positioning sessions when an emergency call is made. The emergency call module 526 and emergency positioning session module 528 may be implemented in hardware, firmware, and software or a combination thereof.

The methodologies described herein in flow charts and message flows may be implemented by various means depending upon the application. For example, these methodologies may be implemented in hardware, firmware, software, or any combination thereof. For a hardware implementation, the processing unit 502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 520 or memory 504 that is connected to and executed by processing unit 502. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions 508 or code on a non-transitory computer-readable medium, such as computer-readable medium 520 and/or memory 504. Examples include computer-readable media encoded with a data structure and computer-readable media encoded with a computer program. Non-transitory computer-readable media includes physical computer storage media. A storage medium may be any available non-transitory medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions.

Memory 504 may represent any data storage mechanism. Memory 504 may include, for example, a primary memory and/or a secondary memory. Primary memory may include, for example, a random access memory, read only memory, etc. While illustrated in this example as being separate from processing unit 502, it should be understood that all or part of a primary memory may be provided within or otherwise co-located/coupled with processing unit 502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 520. As such, in certain example implementations, the methods and/or apparatuses presented herein may take the form in whole or part of a computer-readable medium 520 that may include computer implementable instructions 508 stored thereon, which if executed by at least one processing unit 502 may be operatively enabled to perform all or portions of the example operations as described herein. Computer readable medium 520 may be a part of memory 504.

Thus, the mobile terminal 520 may include means for connecting the dual SIM mobile terminal to a network for an emergency call, wherein the network is one of a first network associated with a first subscription accessed with a first SIM card in the dual SIM mobile terminal and a second network associated with a second subscription accessed with a second SIM card in the dual SIM mobile terminal, which may be, e.g., the transceiver 510 and may further include the emergency call module 526. A means for performing an emergency positioning session through the network may be, e.g., the emergency positioning session module 528, wherein the emergency positioning session is permitted only during an emergency call and the emergency callback period after an emergency call; wherein the emergency positioning session is permitted only on a subscription on which the emergency call is originated; wherein no non-emergency positioning sessions on either the first subscription or the second subscription are permitted during the emergency positioning session or during the emergency call. The means for performing an emergency positioning session through the network, e.g., the emergency positioning session module 528, may further not permit non-emergency positioning sessions on either the first subscription or the second subscription during an emergency callback period after the emergency call.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of supporting an emergency positioning session in a dual Subscriber Identity Module (SIM) mobile terminal, the method comprising:
   connecting the dual SIM mobile terminal to a network for an emergency call, wherein the network is one of a first network associated with a first subscription accessed with a first SIM card in the dual SIM mobile terminal and a second network associated with a second subscription accessed with a second SIM card in the dual SIM mobile terminal; and
   performing the emergency positioning session through the network;
   wherein the emergency positioning session is permitted only during the emergency call and an emergency callback period after the emergency call;
   wherein the emergency positioning session is permitted only on a subscription on which the emergency call is originated;
   wherein no non-emergency positioning sessions on either the first subscription or the second subscription are permitted during the emergency positioning session or during the emergency call, and wherein no non-emergency positioning sessions on either the first subscription or the second subscription are permitted during the emergency callback period after the emergency call.

2. A mobile terminal comprising:
   a first Subscriber Identity Module (SIM) card that accesses a first subscription associated with a first network;

a second SIM card that accesses a second subscription associated with a second network;

a transceiver that communicates with the first network and the second network;

a processor connected to the transceiver, the processor configured to use the transceiver to connect to a network for an emergency call, wherein the network is one of the first network associated with the first subscription accessed with the first SIM card and the second network associated with the second subscription accessed with the second SIM card; and perform an emergency positioning session through the network, wherein the emergency positioning session is permitted only during the emergency call and an emergency callback period after the emergency call, wherein the emergency positioning session is permitted only on a subscription on which the emergency call is originated, and wherein no non-emergency positioning sessions on either the first subscription or the second subscription are permitted during the emergency positioning session or during the emergency call, and wherein no non-emergency positioning sessions on either the first subscription or the second subscription are permitted during the emergency callback period after the emergency call.

3. A dual Subscriber Identity Module (SIM) mobile terminal comprising:

means for connecting the dual SIM mobile terminal to a network for an emergency call, wherein the network is one of a first network associated with a first subscription accessed with a first SIM card in the dual SIM mobile terminal and a second network associated with a second subscription accessed with a second SIM card in the dual SIM mobile terminal; and means for performing an emergency positioning session through the network;

wherein the emergency positioning session is permitted only during the emergency call and an emergency callback period after the emergency call;

wherein the emergency positioning session is permitted only on a subscription on which the emergency call is originated;

wherein no non-emergency positioning sessions on either the first subscription or the second subscription are permitted during the emergency positioning session or during the emergency call, and wherein no non-emergency positioning sessions on either the first subscription or the second subscription are permitted during the emergency callback period after the emergency call.

4. A non-transitory computer-readable medium including program code stored thereon, comprising:

program code to connect a dual SIM mobile terminal to a network for an emergency call, wherein the network is one of a first network associated with a first subscription accessed with a first SIM card in the dual SIM mobile terminal and a second network associated with a second subscription accessed with a second SIM card in the dual SIM mobile terminal; and program code to perform an emergency positioning session through the network;

wherein the emergency positioning session is permitted only during the emergency call and an emergency callback period after the emergency call;

wherein the emergency positioning session is permitted only on a subscription on which the emergency call is originated;

wherein no non-emergency positioning sessions on either the first subscription or the second subscription are permitted during the emergency positioning session or during the emergency call, and wherein no non-emergency positioning sessions on either the first subscription or the second subscription are permitted during the emergency callback period after the emergency call.

* * * * *